Dec. 15, 1970  J. D. HORN ET AL  3,546,790
TEACHING MACHINE FOR DEMONSTRATING FUNCTIONAL RELATIONSHIPS
Filed April 17, 1968
2 Sheets-Sheet 1
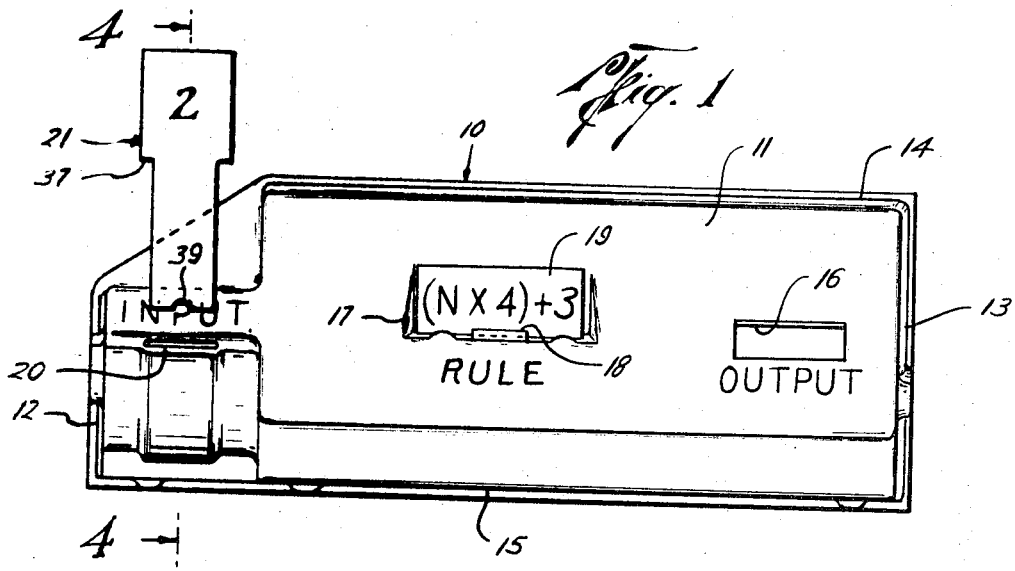
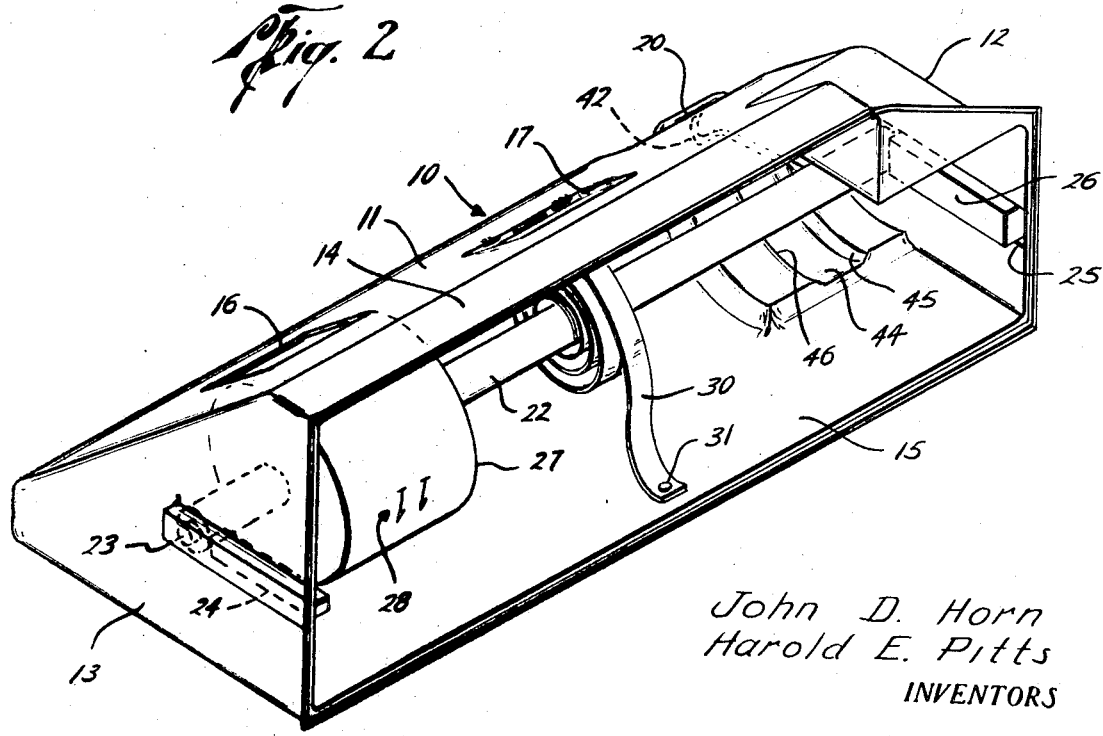
John D. Horn
Harold E. Pitts
INVENTORS
BY
Hayden Pravel Wilson & Matthews
ATTORNEYS Dec. 15, 1970  J. D. HORN ET AL  3,546,790
TEACHING MACHINE FOR DEMONSTRATING FUNCTIONAL RELATIONSHIPS
Filed April 17, 1968  2 Sheets-Sheet 2
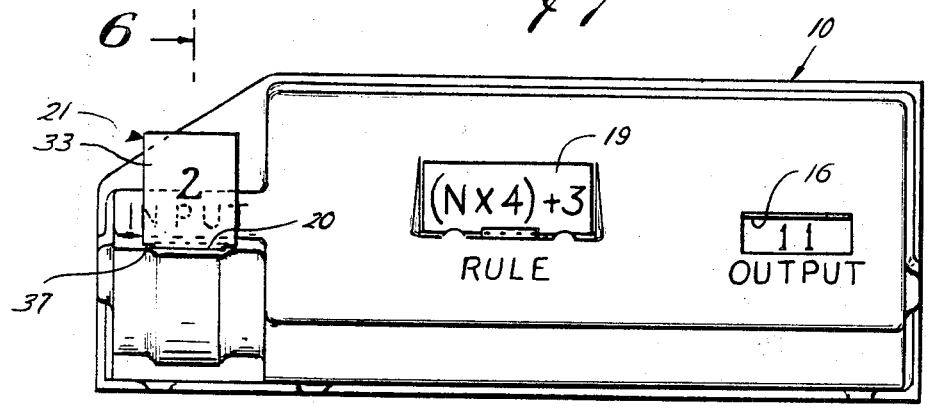
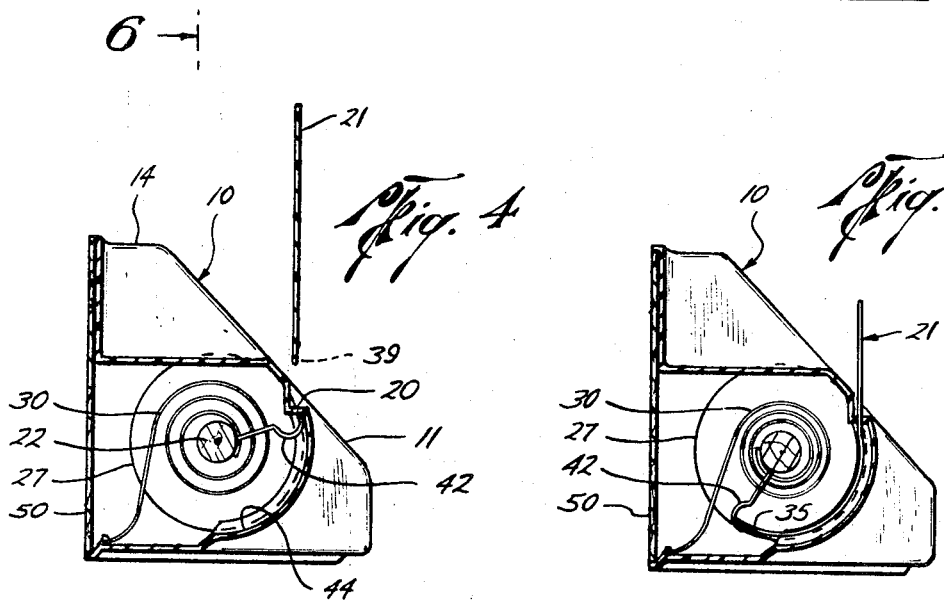
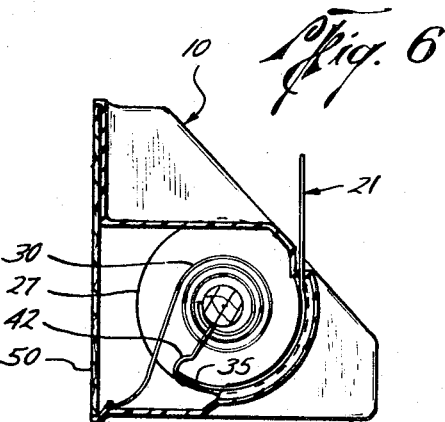
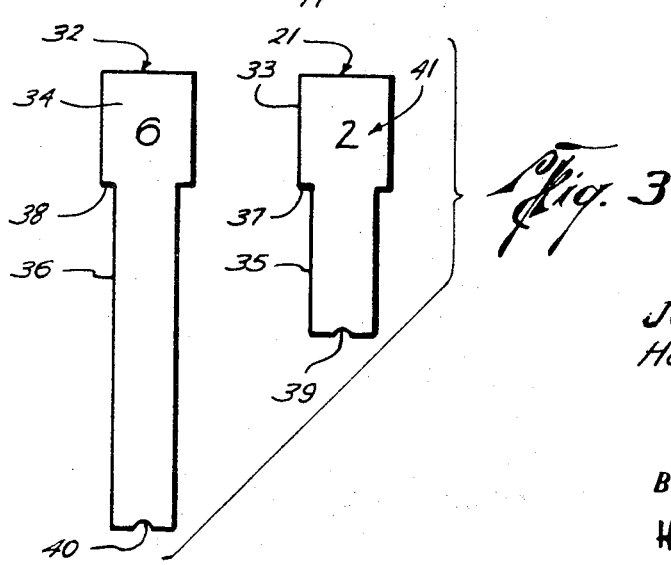
John D. Horn
Harold E. Pitts
INVENTORS
BY
Hayden Pravel Wilson & Matthews
ATTORNEYS

United States Patent Office 3,546,790
Patented Dec. 15, 1970

3,546,790
TEACHING MACHINE FOR DEMONSTRATING FUNCTIONAL RELATIONSHIPS
John D. Horn and Harold E. Pitts, Dallas, Tex., assignors to P & H Educational Aids, a partnership
Filed Apr. 17, 1968, Ser. No. 722,019
Int. Cl. G09b 3/00
U.S. Cl. 35—9       7 Claims

ABSTRACT OF THE DISCLOSURE

A teaching machine for demonstrating the relationship between input members, output numbers, and a rule or equation interrelating same.

BACKGROUND OF THE INVENTION

This invention relates to a teaching machine for educational instruction purposes and is particularly useful for classroom purposes.

In this day and age, with highly-competent teachers being in short supply and with increased emphasis on giving students a more basic understanding of the subject matter being taught, it is desirable to provide the teacher with whatever can be devised in the way of useful and helpful mechanical teaching aids.

SUMMARY OF THE INVENTION

It is an object of the invention, therefore, to provide a new and improved teaching machine for demonstrating the relationship between input factors, ouput factors, and a rule or function interrelating such input and output factors.

It is another object of the invention to provide a new and improved teaching machine of relative simple, economical, and durable construction which can be used by school teachers, or the school children themselves, for enabling school children to gain an understanding of mathematical equations and the answers produced by solving such equations for different values of the variable factors in such equations.

It is a further object of the invention to provide a new and improved teaching machine for demonstrating mathematical relationships and the like wherein the machine is of such construction that it may be readily and easily programed and reprogramed by the teacher to enable her to demonstrate a wide variety of relationships of her own choosing.

In accordance with the invention, there is provided a teaching machine for demonstrating the relationship between input factors, output factors, and a rule or function interrelating such input and output factors. The output factors are written on a drum mounted on a shaft running from side to side inside of the machine cabinet. Only one output factor at a time is exposed through a window in the front of the cabinet. The input factors are written on strips of flexible material of different lengths. A given strip is selected and inserted into an input slot in the front of the cabinet to engage a detent on the shaft and cause rotation of both the shaft and the output factor drum as the strip is inserted. This causes the proper output factor to be displayed in the output window. A rule card is located between the input slot and the output window and has written thereon the rule or equation interrelating the input and output factors.

While the present invention is particularly useful in connection with mathematical relationships, it may also be used to teach or demonstrate chemical relationships, biological relationships and various other types of relationships.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

Referring to the drawings:
FIG. 1 is a front view of a representative embodiment of the teaching machine;
FIG. 2 is a perspective view looking at the teaching machine of FIG. 1 from a rearward direction and with the back cover of the machine removed;
FIG. 3 shows typical input strips or "cards" for use with the FIG. 1 machine;
FIG. 4 is a cross-sectional view taken along the section line 4—4 of FIG. 1;
FIG. 5 shows a front view of the machine of FIG. 1 but with an input card properly inserted in the input slot thereof; and
FIG. 6 is a cross-sectional view taken along the section line 6—6 of FIG. 5.

DESCRIPTION OF THE PREFERRED EMBODIMENT

Referring to FIG. 1, the teaching machine there shown includes a cabinet 10 having a front wall portion 11, two side wall portions 12 and 13, a top portion 14, and a base portion 15. The cabinet 10 is formed of a molded plastic material and is shaped to give a "computer" appearance. An output window 16 is cut through the front wall portion 11 on the right side thereof. A slightly recessed ledge portion 17 having a retaining detent 18 is provided in a central position on the front wall portion 11 for holding a removable rule display card 19. Toward the left side of the front wall portion 11, there is provided an input opening or slot 20 which is cut through to the inside of the cabinet 10. The slot 20 is cut through the top of a slightly protruding portion of the cabinet 10 so that the side walls of the passageway formed by the slot are generally vertical. This input slot 20 is adapted to receive various input elements or input cards, a typical input card being represented at 21.

Referring to FIG. 2, it is seen that there is located inside of the cabinet 10 a cylindrical shaft member 22 which is positioned parallel with the front wall portion 11. The left-hand extremity (as seen in FIG. 2) of the shaft member 22 includes a reduced diameter portion 23 which fits into an outwardly extending recess 24 formed in the side wall 13 of the cabinet 10. The reduced diameter shaft portion 23 is held in position by a retaining member which is secured in the recess 24 to prevent lateral movement of the shaft portion 23. The dimensions are such, however, that the shaft portion 23 is free to rotate about its center axis. At the other side of the machine, the other extremity of the shaft member 22 is retained in an outwardly extending recess 25 formed in side wall portion 12 by means of a retaining member 26 secured in the recess 25. The dimensions are such that this end of the shaft member 22 is also free to rotate. The shaft member 22 and the retaining members are made of wood, the retaining members being glued or otherwise secured in the recesses 24 and 25.

There is coaxially mounted on the shaft member 22 for rotation therewith a drum member 27, such drum member 27 being adapted to carry on the cylindrical surface portion thereof a plurality of indicia representing different possible output factors, one of such indicia being represented at 28 (the indicia in this example being the number "11"). The drum member 27 is positioned immediately behind the output window 16, such window serving to expose the indicia one at a time in sequence as the drum members 27 is rotated. The drum member 27 is in the form of a cylinder having closed ends with holes cut in the centers of the ends for receiving the shaft member 22, and with the member 27 suitably pinned or otherwise fastened to the shaft 22 at the proper position behind the window 16. The cylindrical surface portion of the drum member 27 is coated with a layer of white acetate material such as that sold under the trademark "Mylar" and the output factor indicia (e.g., 28) are written thereon.

In the absence of an input element or input card (e.g., 21), the drum member 27 is maintained in a reference position by means of a coil spring 30. One end of the coil spring 30 is secured to the shaft 22 while the other end is secured to the base portion 15 of the cabinet 10, as indicated at 31. Spring 30 keeps the drum member 27 in a rotational position such that no answer (output indicia) can be seen through the output window 16 (unless, of course, the rule is such that an answer is called for in the case of "zero" input).

Referring to FIG. 3, there is shown a pair of typical input elements or input cards for use with the teaching machine of FIG. 1. The input card previously depicted is indicated at 21 while a second and different input card is indicated at 32. Each of the input cards 21 and 32 is in the form of a flat strip-like member having an enlarged head portion and a narrower body portion, the head portions being indicated at 33 and 34, respectively, and the body portions being indicated at 35 and 36, respectively. This provides shoulder portions 37 and 38 for the input cards 21 and 32, respectively. Small notches 39 and 40 are provided at the lower ends of the input cards 21 and 32, respectively. The input cards 21 and 32 are constructed of an opaque white-color, celluloid-type plastic material. Such material is relatively strong, yet readily flexible to the degree required by the present invention. The surfaces of the input cards 21 and 32 are relatively slick and impervious so that indicia representing different input factors may be written on and subsequently erased from the head portions of the input cards 21 and 32. A typical indicia (the number "2") is indicated at 41 for the input card 21. The different input cards 21 and 32 are constructed so that the lengths of their narrower body portions 35 and 36 are different. For the case shown, the body portion 36 of the input card 32 is substantially longer than the body portion 35 of the input card 21.

The teaching machine of the present invention will normally be provided with more than just two input cards. For example, it has been found useful to employ five such input cards. Regardless of the number, each of the different input cards is provided with a different length for the narrower body portion thereof.

Referring now to FIG. 4, there is shown a cross-sectional view taken along section line 4—4 of FIG. 1. In order to enable the input card (e.g., 21) to cause rotation of the drum member 27 when it is inserted into the input slot 20, the shaft member 22 is provided with detent means in the form of a metal hook 42 which is screwed into or embedded into the shaft 22 at a position along the shaft 22 which is in line with the input slot 20. FIG. 4 shows the hook 42 in the "no input" position, the curved portion of the hook being located immediately below the slot 20. As the input card 21 is inserted into the slot 20, the notch 39 in the bottom end thereof engages the curved portion of the hook 42. As the input card 21 is pushed further into the slot 20, the card 21 causes the hook 42 to pivot around the center axis of the shaft 22. This rotates the shaft 22 which, in turn, rotates the drum member 27.

In order to keep the notch 39 of the card 21 properly engaged with the hook 42 and to cause proper movement of the hook 42, the cabinet 10 is provided with guide means in the form of a curved chute-like portion 44, which may be an integral part of the molded plastic material forming the cabinet 10. The chute portion 44 insures that the flexible input card 21 will not flex beyond the curvature of such chute portion, thus providing the proper movement for the hook 42. Hook 42 extends into the region defined by the chute portion 44 and the curvature of such chute portion corresponds to the arc described by the hook 42 as it rotates around the axis of the shaft 22. As seen in FIG. 2, the chute portion 44 is provided with raised side wall portions 45 and 46. These also guide the input card (e.g., 21) in the right direction.

FIGS. 5 and 6 correspond to FIGS. 1 and 4, respectively, but illustrate the case where the input card 21 is inserted into the input slot 20 the proper distance for giving the right answer at the output window 16. This condition occurs when the shoulder portion 37 of the input card 21 abuts against the lip of the input slot 20. In this regard, the width of the input slot 20 is less than the width of the head portion 33 of the input card 21. As seen in FIG. 6, when the input card 21 has been properly inserted to the maximum degree, the body portion 35 thereof rotates the hook 42 a substantial distance around the center axis of the shaft member 22. (The angular rotation shown in FIG. 6 for card 21 has been exaggerated for purposes of emphasis.) As further seen in FIG. 6, the coil spring 30 is more tightly wound at this time.

When the card 21 is removed from the machine, the coil spring 30 will then tend to uncoil so as to reverse the rotation of the shaft member 22 and return both the hook 42 and the drum member 27 to their original rotational positions (as shown in FIG. 4).

The rule display card 19 which is adapted to be placed in and removed from the card holder formed by the ledge portion 17 is a thin rectangular strip formed of the same material as are the input cards.

The back cover for the cabinet 10 is indicated at 50 in both FIGS. 4 and 6. It is a separate piece of rigid fiberboard material which is glued to the back of the cabinet 10.

The surface portions of the drum member 27, the input cards (e.g., 21) and the rule display card 19 are of such a nature that they may be written upon by means of a crayon, wax pencil, grease pencil, or the like, and yet the written legends may subsequently be erased or removed when desired. Various plastics are suitable for such purpose; for example, celluloid, vinyl resins, polyethylene resins, and acetates may be used.

Considering now the use of the teaching machine, it is initially assumed that no indicia or numbers have been written on any of the input cards, the rule card 19, or the drum member 27. The teacher then decides on the rule, he or she wishes to demonstrate, for example, the equation:

$$M=(N\times 4)+3,$$

where M denotes the output factor and N denotes the input factor. The teacher then writes the main body of the rule on the rule card 19 and places it on the card holding ledge 17 on the front of the machine. Next, the teacher selects a different input number for each of the different input cards which is available and writes one number on each card. Numbers "2" and "6" are represented on the input cards 21 and 32 shown in FIG. 3. The teacher then places the first of the input cards into the machine and while holding it all the way down writes the correct answer on the surface portion of the drum member 27 which is exposed through the output window 16. For example, if the input card bearing the number "2" is placed in the machine, then the number "11" would be written on the drum surface, this being the case illustrated in FIG. 5. This process is repeated for each of the other input cards. When all of the answer numbers have been written on the drum member 27, the programing of the machine is completed and the machine is ready for demonstration to or use by the students.

There are three basic ways the teaching machine may be used. It may be used to have the students try to discover either: (1) the output factor, (2) the rule, or (3) the input factor. In the first case, the input card is not placed in the machine until the student has stated his answer. In the second case, the rule is hidden from view by turning the written side of the rule card towards the body of the machine and the different input cards are inserted into the machine one at a time. For the third case, the input factors may be hidden from view by turning the written side away from the student when placing the input cards in the machine.

The teaching machine may be used as long as desired after each programing. When the teacher is finished with a given program, he or she simply wipes all the cards and the drum surface clean with a piece of soft cloth or tissue paper.

The teaching machine of the present invention is constructed so that the teacher may hold the machine in one hand while manipulating the input cards with the other hand. This facilitates classroom demonstration in that the teacher is not circumscribed to one place and is free to move about. This allows all of the students to see the machine up close.

The student may use the machine individually at his or her desk or at a table, if desired. Primary and intermediate children have used the present invention successfully and with ease. It is intriguing yet simple to manipulate.

What is claimed is:

1. A teaching machine for demonstrating the relationship between input factors, output factors, and a rule or function interrelating such input and output factors comprising:
   a cabinet having a front wall portion, two side wall portions, and a base portion;
   a shaft member located inside the cabinet parallel to the front wall portion and rotatably secured at its extremities to the two side wall portions;
   a drum member coaxially mounted on the shaft member for rotation therewith, such drum member being adapted to carry on the cylindrical surface portion thereof a plurality of indicia representing different possible output factors;
   an output window located in the front wall portion of the cabinet adjacent the drum member for exposing only one output factor indicia at a time;
   an input slot located in the front wall portion adjacent the shaft member;
   a plurality of flexible strip-like input cards of different lengths and individually adapted to be inserted into the input slot, such input cards being individually adapted to carry an indicia representing a different input factor;
   a detent member secured to the shaft member adjacent the input slot for engaging an inserted input card for causing rotation of the shaft member and the drum member for exposing the proper output factor indicia in the output window;
   a spring connected to the shaft member and to the cabinet for rotating the drum member to a reference position when an input card is removed from the input slot; and
   curved guide means for guiding an inserted input card in a curved path substantially defined by an arc through which said detent member rotates upon engagement by the inserted input card.

2. A teaching machine in accordance with claim 1 wherein said curved guide means comprises: a curved groove formed as part of the interior of the front wall portion of said cabinet, and extending from said input slot along the arc described by the rotation of said detent member.

3. A teaching machine in accordance with claim 1 which also includes a display surface positioned on the front wall portion of the cabinet intermediate the input slot and the output window and adapted to carry thereon a representation of the rule or function to be demonstrated.

4. A teaching machine in accordance with claim 3 wherein the indicia-bearing surfaces of the drum member and the input cards and the rule-bearing portion of the display surface are formed of a material which may be written upon by means of a wax pencil or the like and which may be wiped clean when it is desired to reprogram the machine to demonstrate a different set of input and output factors or a different rule or function.

5. A teaching machine for demonstrating the relationship between input factors, output factors, and a rule or function interrelating such input and output factors comprising:
   a cabinet;
   a shaft member located inside the cabinet and rotatably secured thereto;
   a drum member coaxially mounted on the shaft member for rotation therewith, such drum member being adapted to carry on the cylindrical surface portion thereof a plurality of indicia representing different possible output factors;
   an output window located in the cabinet adjacent the drum member for exposing only one output factor indicia at a time;
   an input slot located in the cabinet adjacent the shaft member;
   a plurality of flexible strip-like cards of different lengths and individually adapted to be inserted into the input slot, such input cards being individually adapted to carry an indicia representing a different input factor;
   a coiled spring connected at its inner end to said shaft member and at its outer end to said cabinet for urging said shaft member to rotate to a reference position after having been rotated to expose indicia at said output window; and
   a detent member secured to the shaft member adjacent the input slot for simultaneously rotating said shaft member to expose indicia at said output window and winding said spring more tightly with respect to the shaft member upon engagement by the inserted input card, whereby upon withdrawal of said card said spring acts to reverse the rotation of said shaft member to return it to its reference position.

6. A teaching machine in accordance with claim 5 including:
   curved guide means for guiding an inserted input card in a curved path substantially defined by an arc through which said detent member rotates upon engagement by the inserted input card.

7. A teaching machine in accordance with claim 6 wherein said curved guide means comprises:
   a curved groove formed as part of the interior wall of said cabinet and extending from said input slot along the arc described by the rotation of said detent member.

References Cited
UNITED STATES PATENTS 2,586,564    2/1952    Rinde _____ 35—9

WILLIAM H. GRIEB, Primary Examiner

U.S. Cl. X.R.

35—31